United States Patent [19]
Wilke

[11] 3,729,026
[45] Apr. 24, 1973

[54] CONTROL VALVE WITH METERING TYPE VALVE SPOOL

[75] Inventor: Raud A. Wilke, Brookfield, Wis.

[73] Assignee: Koehring Company, Milwaukee, Wis.

[22] Filed: May 17, 1971

[21] Appl. No.: 143,833

[52] U.S. Cl. .........137/625.69, 251/282, 137/625.37
[51] Int. Cl. ...........................................F16k 11/07
[58] Field of Search.......137/625.28–625.39, 625.69; 251/282

[56] References Cited

UNITED STATES PATENTS

| | | | |
|---|---|---|---|
| 3,534,774 | 10/1970 | Tennis | 137/625.69 X |
| 3,151,630 | 10/1964 | Tennis | 137/625.69 X |
| 3,529,702 | 9/1970 | Eckstein | 137/625.69 X |
| 2,783,745 | 3/1957 | Stephens | 137/625.69 |
| 3,198,212 | 8/1965 | Junck et al. | 137/625.37 |
| 3,263,574 | 8/1966 | Tennis | 137/625.69 X |

FOREIGN PATENTS OR APPLICATIONS 1,500,213  7/1969  Germany..................137/625.69

Primary Examiner—Henry T. Klinksiek
Attorney—Ira Milton Jones

[57] ABSTRACT

Wherever flow of pressure fluid from upstream to downstream passages in the valve body is metered by passage through throttle notches in the spool lands, the metered fluid debouches from said notches into the bore in which the spool operates before flow thereof to said downstream passages. Each throttle notch opens to the periphery of its land and to the adjacent spool groove between lands, and it has a bottom wall which recedes from the plunger axis toward the adjacent groove at an angle of from 5° to 25°, and a concave side wall which is normal to said bottom wall.

12 Claims, 7 Drawing Figures

Patented April 24, 1973

Inventor
Ravd A. Wilke
By Tradmitton Jones
Attorney

TO DOWNSTREAM VALVE

CONTROL VALVE WITH METERING TYPE VALVE SPOOL

This invention relates to hydraulic control valves of the type having a valve plunger in the form of a spool which is movable axially in a bore to different operating positions to control fluid flow between various passages which open to the bore at axially spaced locations. More particularly, this invention has reference to control valves whose spools have axially spaced grooves which define lands thereon, and wherein so-called throttle notches in end surfaces of the lands make it possible to meter fluid flow between various passages communicated with one another through the spool grooves.

The advantages accruing from the provision of such throttle notches in the ends of the lands on the spools of hydraulic control valves are well known. Among the more obvious are that they provide assurance of a gradual increase and/or decrease in the flow of pressure fluid between valve passages as the spool is moved from one position to another, to thereby prevent sudden pressure shocks in the system; and they are invaluable for effecting precise metering control over the speed of operation of mechanisms governed by the control valve.

There have been many attempts in the past to provide such throttle notches with special configurations intended to make possible actuation of the valve spool from one position to another with low effort. The U.S. Pat. to Junck et al. Nos. 2,971,536 and 3,198,212, and those to Miller No. 3,009,480 and Darling No. 3,123,335 are representative of those which purport to provide solutions to that problem. All such solutions seem to be mainly based upon the discoveries outlined in U.S. Pat. No. 2,747,612 granted to Shih-Ying Lee May 29, 1956.

In brief, the patentees mentioned above endeavored to reduce the axial momentum or reaction forces imposed upon the valve spool as a consequence of rapid flow of high pressure fluid through the circumferential grooves in the spool during transfer of such fluid between various passages in the valve body. These axial forces on the spool are greatest when the spool occupies metering positions in its bore, with the ends of its lands closely adjacent to portions of the bore through which pressure fluid must flow on its way from one valve passage to another.

Certain of the prior art patentees mentioned above sought to provide throttle notches so shaped that the axial momentum forces opposed the return force of the centering spring acting upon the valve spool, while others sought opposite results, namely to design the notches so that the momentum forces would assist the return spring. As far is as known, however, no one has heretofore succeeded in the provision of a hydraulic control valve with a metering type valve spool capable of being shifted from any position thereof to any other position with a minimum of effort, and it is the purpose of this invention to provide such a control valve.

In general, it is an object of this invention to significantly reduce the axial momentum forces which pressure fluid imposes upon the valve spool of a hydraulic control valve by means which involves a special arrangement of valve passages and lands with throttle notches therein, whereby pressure fluid debouches from the throttle notches into the bore wherever the flow of pressure fluid between passages is metered by its passage through said notches.

In brief, the metering relied upon in this invention to achieve the desired reduction in axial reaction forces on the valve spool can be said to consistently follow the "metering in" principle, where the pressure fluid is metered on its way to the bore in which the valve spool operates. This is in contrast to those systems in which the pressure fluid is metered as it leaves the bore for entry into a downstream passage, and also to those where fluid is metered to the bore at one zone and from the bore at other zones.

Another object of the invention resides in the provision of throttle notches in the lands of a valve spool so shaped and oriented as to effect the desired reduction in the axial momentum forces which pressure fluid imposes upon the spool without rendering the spool unstable in any of its metering positions.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several examples of the embodiments of the invention constructed according to the best modes so far devised for the practical application of the principles thereof, and in which.

Figure 1:
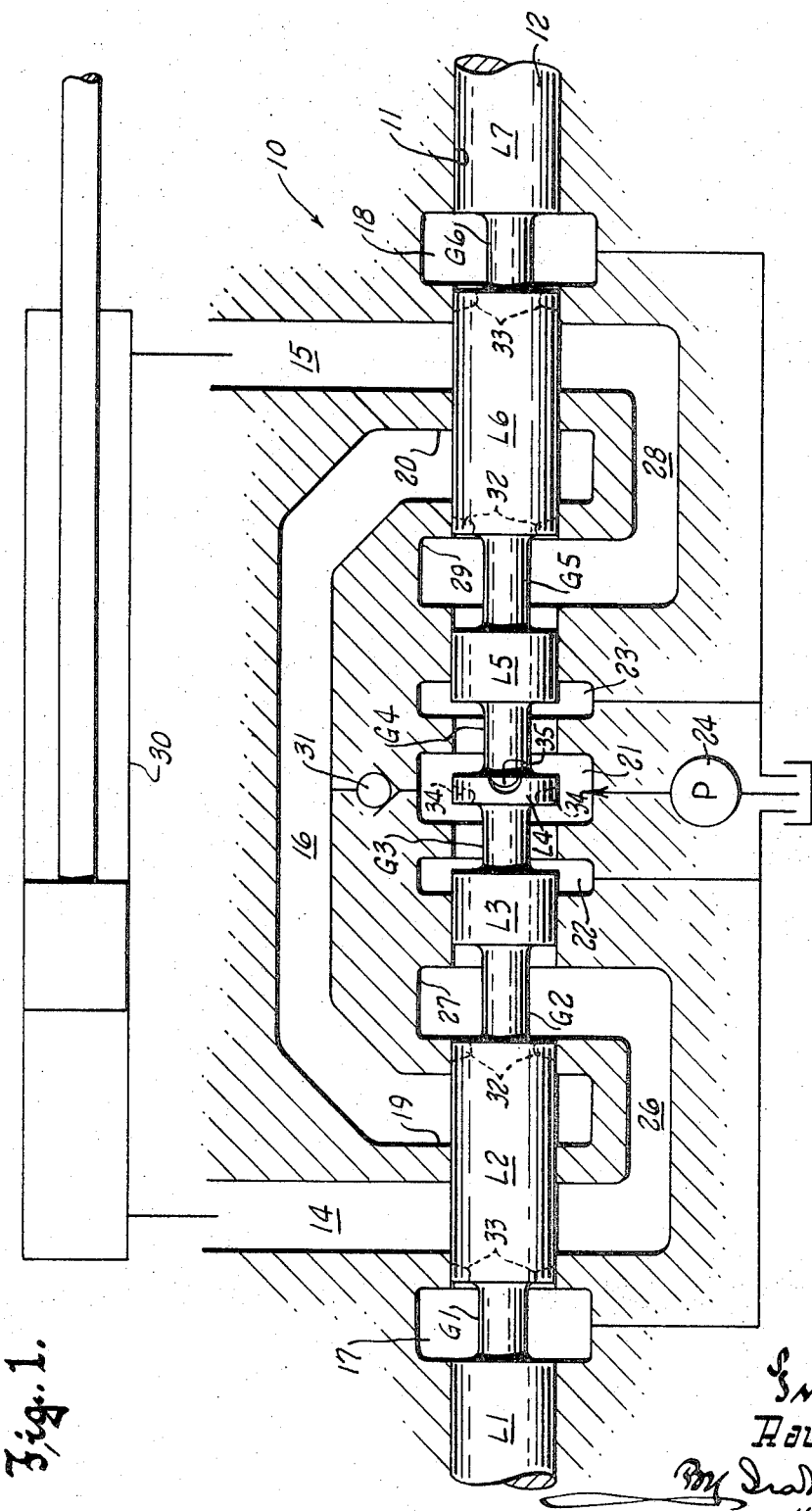
FIG. 1 is a more or less diagrammatic sectional view of a hydraulic valve embodying this invention.

Referring now to the accompanying drawings, the numeral 10 generally designates the body of a hydraulic control valve embodying the principles of this invention. The body has a bore 11 in which an elongated valve element or spool 12 is endwise slidably received for movement from a neutral position (shown) to each of a pair of operating positions to provide for connection of either of a pair of service passages 14–15 with a feeder passage 16 and the other service passage with one of a pair of exhaust ports 17–18.

A conventional spring centering mechanism (not shown) is connected with the spool to yieldingly resist movement thereof out of its neutral position.

While the functions of the spool described can be said to be conventional, the manner in which it performs those functions is of the essence of this invention and requires not only a special arrangement of passages in the valve body but also a spool of special construction.

The spool, for example, is provided with six circumferential grooves which are cut therein at axially spaced locations. Reading from left to right in FIG. 1, these grooves have been assigned the reference characters G1, G2, G3, G4, G5 and G6. A series of lands are defined by these grooves, and reading from left to right, the lands are identified by the reference characters L1, L2, L3, L4, L5, L6 and L7.

The porting of the valve at the bore 11 is such that, with respect to the neutral position of the spool 12 seen in FIG. 1, the exhaust or tank ports 17 and 18 open to the bore at locations axially adjacent to but outwardly of the junctions between the bore and their respective service passages 14–15, and in register with the axially outermost grooves G1, G6. The feeder passage 16, which is of substantially inverted U shape, opens to the bore through ports 19, 20 at its opposite ends, which ports are axially inwardly adjacent to the junctions between the bore and the service passages 14, 15.

A center port 21 and two flanking ports 22 and 23 open to the bore midway between the ports 19 and 20 of the feeder passage 16. The center port 21 is connected to the inlet of the valve to receive pressure fluid as from a pump 24, and can be considered as the upstream branch of a three-pronged supply passage in the valve body. The two flanking ports 22, 23 comprise downstream branches of the open center passage which can lead to the outlet of the valve and to tank, as indicated, or to the upstream branch of the next valve section, if one is provided. Actually, it is immaterial to this invention whether the control valve is of the open center or closed center type. Hence, the ports 21, 22 and 23 can be more generically termed those of a supply passage, and that terminology is used in the appended claims.

The land L4 of the spool is centered with respect to the port 21, and the two grooves G3 and G4 normally communicate the center port 21 with its flanking downstream ports 22, 23. Hence, in the neutral position of the spool, pump fluid entering the upstream branch of the open center passage can flow uninterruptedly through the bore 11 and grooves G3 and G4 to the two downstream branches of the open center passage.

Figure 2:
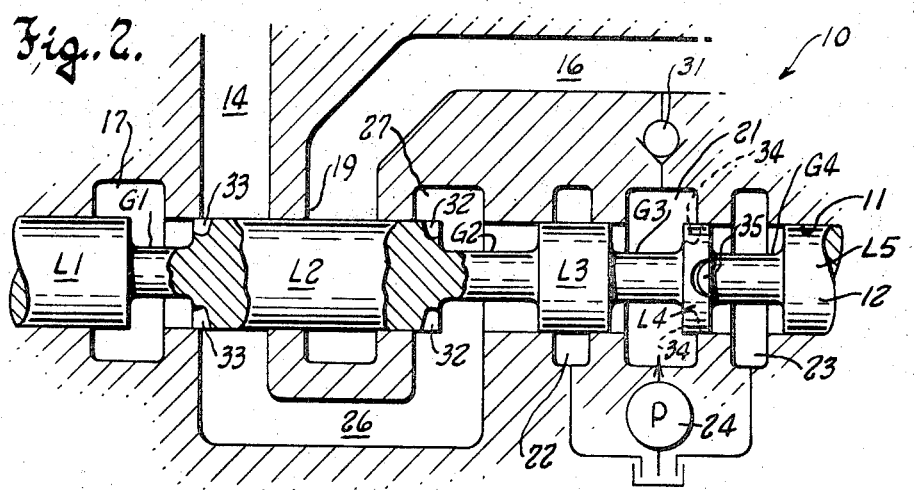
FIGS. 2 and 3 are sectional views showing part of the valve of FIG. 1, with the spool thereof in two different operating positions.
Figure 3:
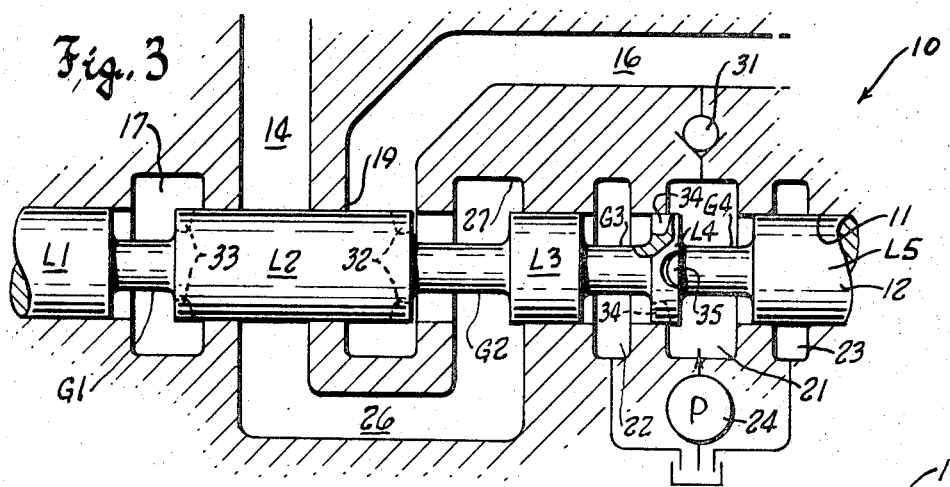

A highly important feature of the valve seen in FIGS. 1, 2 and 3 resides in the fact that each service passage 14, 15 communicates with the bore at two zones, one of which is located between its adjacent exhaust and feeder ports, and the second of which is located between its adjacent feeder port and one of the downstream ports 22, 23 of the open center passage. For this purpose, the feeder passage 14 is provided with a branch 26 which leads to a port 27 that opens to the bore at a location between the ports 19 and 22; and the service passage 15 is likewise provided with a branch 28 which leads to a port 29 that opens to the bore at a location between ports 20 and 23.

It will also be seen that in the neutral position of the valve spool 12, its lands L2 and L6 close off the service passages from their respective exhaust ports 17, 18 and from their adjacent feeder ports 19, 20; while the ports 27 and 29 of the service passage branches 26 and 28 register with the spool grooves G2 and G5, respectively. Pressure fluid can neither flow to or from a double-acting cylinder 30 having its opposite ends connected with the service passages 14, 15 as indicated in FIG. 1.

If the valve spool 12 is shifted to a full operating position to the right of neutral, lands L3 and L4 close off the upstream branch 21 of the open center passage from the downstream branches 22, 23 thereof to cause pump fluid to be diverted to the feeder passage 16 via a check valve 31; pressure fluid from the feeder passage flows to the rod end of the cylinder through the spool groove G5, passage 28 and service passage 15; and return fluid from the head end of the cylinder flows to the exhaust port 17 by way of service passage 14 and spool groove G1. Such fluid flow to and from the cylinder is reversed when the valve spool is shifted to a full operating position to the left of neutral.

According to this invention, throttle notches are formed in the ends of certain of the lands for the usual purposes, but in a special manner now about to be described, for the express purpose of limiting or decreasing to a predetermined minimum, the axial reaction forces which pressure fluid flowing through the spool grooves exerts upon the spool and which are most pronounced in such metering positions thereof as seen for example in FIGS. 2 and 3.

Each of the lands L2 and L6 is provided with at least one pair of diametrically opposite throttle notches 32 in its axially inner end, as well as with at least one pair of similar diametrically opposite throttle notches 33 in its axially outer end. The center land L4 is the only other one to be provided with throttle notches. It has a first pair of throttle notches 34 which open to its left hand end at diametrically opposite locations, and a second pair of notches 35 which open to its right hand end at locations midway between the notches 34.

It is important to note that the flow of pump fluid from the upstream branch 21 of the open center passage can be metered through the throttle notches 34 or 35 to one or the other of the downstream open center branches 22 or 23, depending upon the direction the valve spool is shifted from neutral.

It is of even greater importance to this invention that such metering of fluid flow to either downstream branch of the open center passage be effected as the fluid enters the bore 11, so that the downstream branches will always receive pump fluid which debouches to the bore from the throttle notches in the center land L4 on the valve spool.

Metering of pressure fluid flowing to the bore is also a requisite for transfer of fluid between the service passages and their respective feeder and exhaust passages. It is for this reason that each service passage has a separate branch to communicate it with the bore at two axially spaced apart zones at opposite sides of the zone of communication between the adjacent feeder port and the bore. In other words, feeder port 19 is located between the two zones at which service passage 14 communicates with the bore; and feeder port 20 is located between the two zones at which service passage 15 communicates with the bore.

Consequently, all pump fluid flowing to service passage 14 from feeder port 19 must pass through the throttle notches 32 in land L2 before debouching therefrom to the bore, then through spool groove G2 and passage 26 to service passage 14. Similarly, all pump fluid flowing to service passage 15 from feeder port 20 must first flow through the throttle notches 32 in land L6 before entering the bore, then through spool groove G5 and passage 28 to service passage 15. In other words, the fluid in the feeder passage is metered before it enters the bore for flow to either service passage.

FIG. 2 illustrates the valve spool 12 in a metering position displaced to the right of neutral, at which it is operable to effect delivery of a metered amount of pressure fluid to the rod end of cylinder 30 via service passage 15. Note that in this position of the spool, pressure fluid flowing from feeder port 20 to service passage 15 will be metered by its passage through the throttle notches 32 in land L6 before it enters the bore 11; pressure fluid in the upstream branch 21 of the open center passage is flowing in a metered amount through the throttle notches 35 to the bore on its way to port 23; and fluid expelled to service passage 14 from the head end of the cylinder 30 flows to the exhaust port 17 through the groove G1 and bore 11, but only after having first passed to the bore through the throttle notches 33 in land L2. Exhaust fluid from the rod end of the cylinder is returned to exhaust port 18 in like manner, when the spool is in the metering position seen in FIG. 3. In that case, the exhaust fluid passes first through the throttle notches 33 in land L6 to the bore 11, and then travels through spool groove G6 to the exhaust port 18. Also, pump fluid flows in a metered amount from feeder port 19 to service passage 14 via throttle notches 32 in land L2, which notches are located such that fluid metered by passage therethrough debouches into the bore 11.

From this it can be said that the valve passages, spool grooves, lands and throttle notches are so arranged that in any metering position of the valve spool, pressure fluid flowing through the bore between passages communicated by the spool is constrained to flow from the upstream passages through throttle notches in the spool lands before entering the bore. This holds true regardless of whether pump fluid is being metered through the notches or whether return fluid from the motor is being metered on its way to the exhaust ports.

Because of this, and especially because of the three-pronged open center passage arrangement and the placement of throttle notches 34, 35 in the opposite ends of the center land L4, the axial reactionary or momentum forces that are imposed upon the valve spool due to restricted flow of high pressure fluid through the grooves G3 or G4 are greatly reduced. Moreover, those reactionary or momentum forces will be of substantially the same value regardless of the direction in which the spool is displaced from neutral, as long as the spool is displaced the same distance from neutral.

Figure 4:
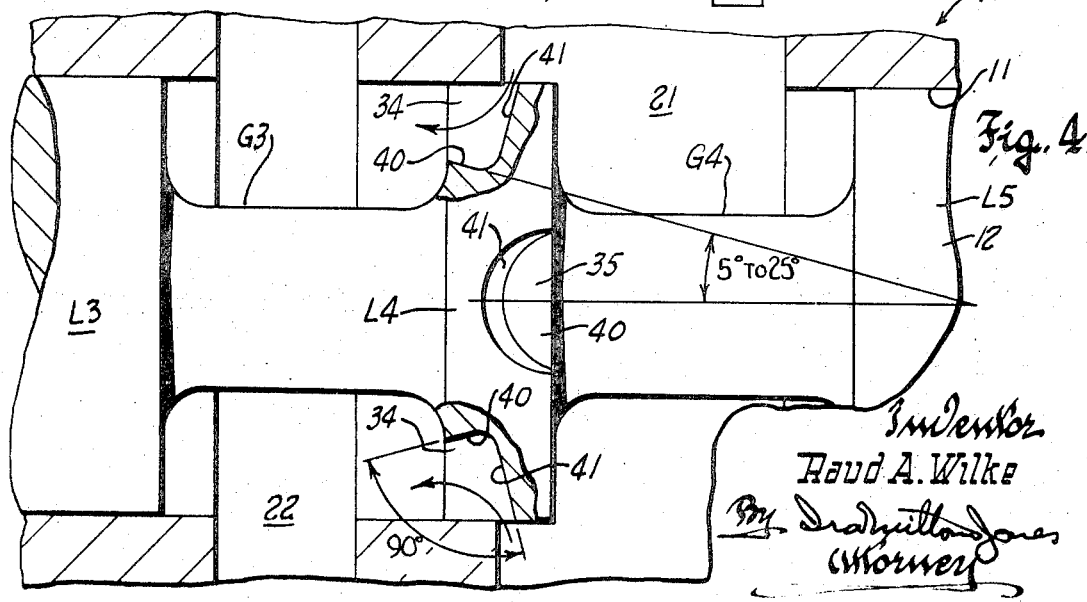
FIG. 4 is an enlarged fragmentary view of a portion of the valve seen in FIG. 3.

Still further reduction in the axial momentum forces which fluid exerts upon the valve spool as an incident to restricted flow from one valve passage to another is possible when the throttle notches are formed as shown in detail in FIG. 4. As therein seen, the valve spool is in a metering position like that of FIG. 3, with its center land L4 disposed partway in the bore 11 between open center ports 21 and 22. Each of the throttle notches 34 can be said to be tilted back toward the opposite axial end of the land. Hence, it will have a substantially flat bottom 40 which diverges from the spool axis outwardly toward the adjacent groove G3. This is the same as saying that the bottom converges toward the spool axis along a line which passes through that end of the land L4 to which its other notches 35 open. Preferably, the angle which the bottoms 40 of the notches define with respect to the spool axis can be varied from 5° to 25°, but it should be the same for the notches in any one spool. The notches 34 also have cylindrically surfaced side walls 41 which are normal to their bottom walls 40.

The notches 35, of course, are tilted back at an angle opposite to that of the notches 34; and this same tilted arrangement is followed for notches 32 and 33 in lands L2 and L6 as well.

Tests have shown that it is desirable for stability of the valve spool to avoid reduction of axial momentum forces on the spool beyond about 5 to 15 pounds of positive force, which can be defined as the force which opposes the return force of the centering spring acting upon the spool. Notches tilted at an angle of about 21° to the spool axis have been found to be ideal in this respect, since there is little or no criticality in the depth of the notches at that angle. As said angle decreases from about 21°, the criticality of notch depth increases, and deepening thereof becomes necessary to avoid reduction of the axial momentum forces to an extent at which the spool becomes unstable and tends to vibrate when in its metering positions. Ordinarily, the notches should have a radial depth at least equal to their maximum axial depth at the periphery of the spool.

Figure 5:
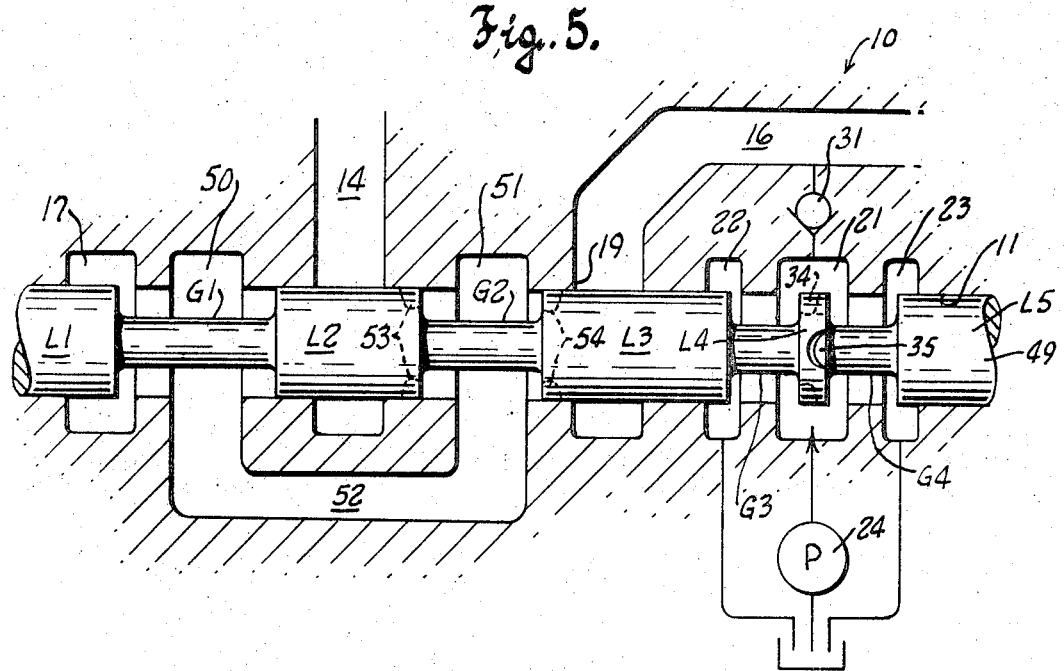
FIGS. 5, 6 and 7 are more or less diagrammatic views illustrating modified embodiments of the invention.

Only one-half of a modified control valve is shown in FIG. 5, it being understood that the valve is symmetrical about the centerline of the upstream branch 21 of its three-pronged open center passage. It differs from the previously described valve mainly in that the valve spool 49 has a land L2 that normally blocks flow to and from only the associated service passage 14, and another land L3 that normally blocks fluid flow from the feeder port 19 into the bore 11.

The service passage 14 opens to the bore at a zone which is between and spaced axially a considerable distance from the adjacent tank port 17 and feeder port 19, and which distance is sufficient to accommodate a pair of ports 50 and 51 at opposite sides of the service passage. The ports 50 and 51 comprise the terminal ends of a separate U-shaped passage 52.

In this case, the spool grooves G1 and G2 normally register with the ports 50, 51 of passage 52; and the adjacent ends of the lands L2 and L3 are provided with throttle notches 53 and 54, respectively, like those previously described. The center land L4, of course, has throttle notches in its opposite axial ends, as before.

With the arrangement thus described, the spool 49 can be shifted to operating positions at either side of its neutral position shown, to meter the flow of pump fluid to the service passage 14 or to meter the flow of cylinder exhaust fluid from service passage 14 to the exhaust port 17. For example, movement of the spool to a metering position to the right of neutral again disposes the center land in a position partially closing off the open center passage and causing pump fluid to flow in a metered amount from the center branch 21 thereof to the downstream branch 23 via the throttle notches 35 in the right hand end of land L4. At the same time, pump fluid is diverted to the feeder passage 16 and to port 19 thereof, which will then be in limited communication with the port 51 of passage 52 via the throttle notches 54 in the left hand end of land L3 and spool groove G2. Pump fluid will then flow restrictedly from feeder port 19 to the bore 11, and to the service passage 14 which is then in communication with the port 50 of passage 52 through spool groove G1.

In the left hand metering position of spool 49, the flow of return fluid from service passage 14 to exhaust port 17 is metered through the throttle notches 53 which debouch into the bore 11 and to port 51 of passage 52, port 50 of which is then in full communication with the exhaust port 17.

It will thus be seen that flow of pressure fluid to and from the second service passage (not shown) can be controlled and metered in like fashion, with flow of pump fluid directed thereto at times when passage 14 is communicated with the exhaust port, and vice versa.

Again in this case, it will be observed that all metering of fluid flow through the throttle notches takes place as pressure fluid flows to the bore on its way from one valve passage to another.

Figure 6:
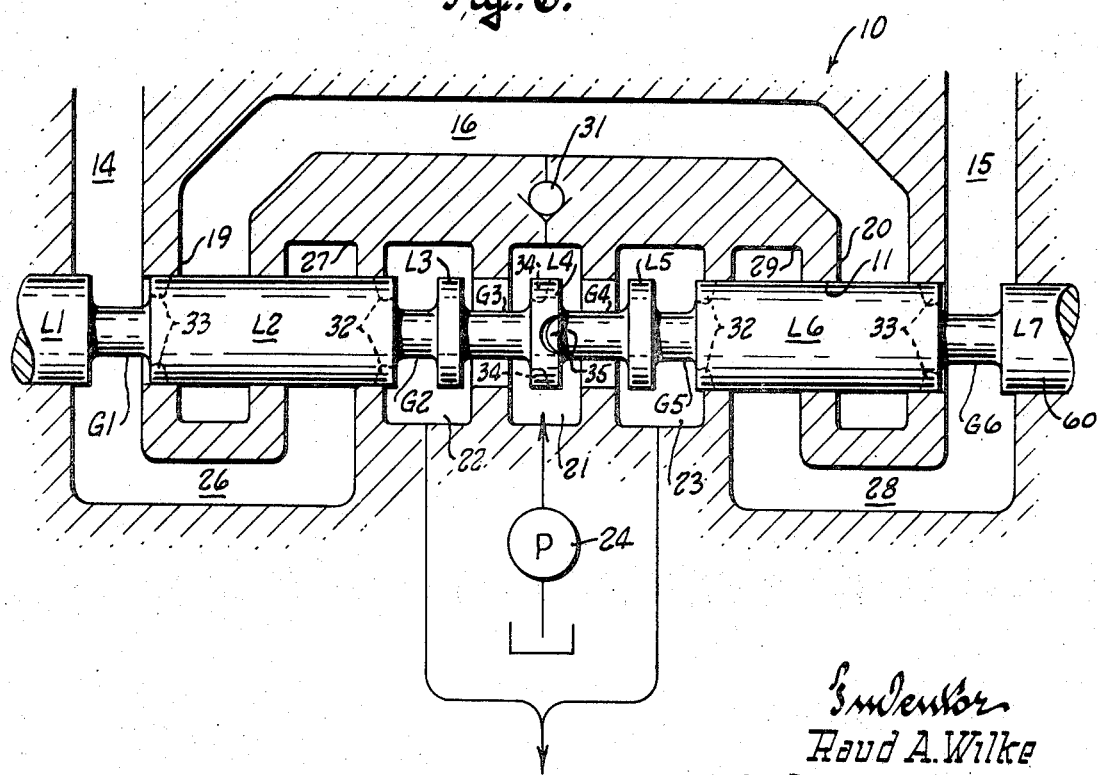

This same concept is also applicable to the series valve construction more or less diagrammatically illustrated in FIG. 6. It will again be appreciated that a conventional centering spring mechanism, not shown, is connected to the valve spool 60; and that the downstream branches 22, 23 of its open center passage connect with the center branch of a downstream valve mechanism, not shown. The downstream valve, however, need not be a series valve. It can be like any of those described thus far.

The arrangement of ports and passages in the valve of FIG. 6 is generally like that of FIG. 1; but the spacing and dimensioning of the lands L3, L4 and L5 on the spool 60 is such that the service passage 14 is connectable with the downstream branch 22 of the open center passage in one operating position of the valve spool, while the service passage 15 is communicable with the other downstream branch 23 of the open center passage in the other operating position of the valve spool. Hence, fluid expelled to either service passage 14 or 15 will be returned to one or the other of the downstream branches of the open center passage, to be made available for operation of a fluid motor governed by a second control valve mechanism downstream from the first.

In this instance also, pump fluid is fed to the service passages directly from the feeder ports 19 and 20, via the grooves G1 or G6 and the throttle notches 33 in the ends of lands L2 and L6. This is because lands L2 and L6 bridge the feeder ports 19, 20 and their adjacent service passage ports 27, 29, while the grooves G1 and G6 register with the service passages.

Figure 7:
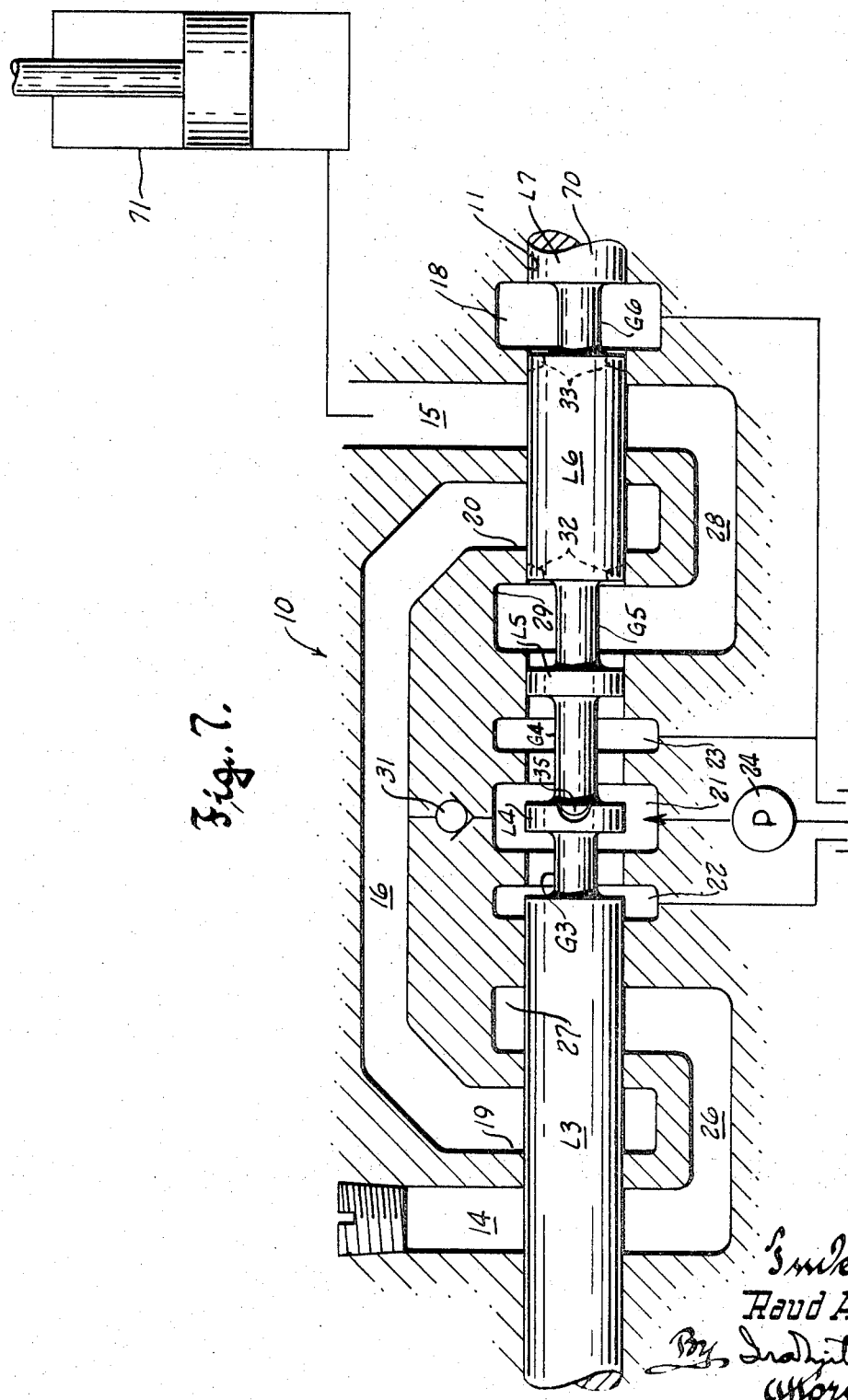

FIG. 7 illustrates how the throttle notch principle of this invention can be embodied in lands on the spool 70 of a control valve for a single acting hydraulic motor, to obtain the same low effort of spool actuation as in the other embodiments described above. As seen in FIG. 7, the service passage 14 is plugged and passage 15 is connected with the port of a single acting lift cylinder 71 to supply pump fluid thereto and to exhaust fluid therefrom under the control of the valve spool 70.

The spool 70 is generally like that seen in FIG. 1, except that the grooves G1 and G2 can be eliminated from its left hand end to leave only one long land where before it there were three lands L1, L2 and L3. The spool differs from that of FIG. 1 in one other respect, namely, in that its groove G4 is considerably longer, and its land L5 is shorter by a corresponding amount. Consequently, pump fluid will continue to flow between branches 21 and 23 of the open center passage when the valve spool is in a left hand operating position communicating the service passage 15 with its exhaust port 18.

While the land L6 requires throttle notches 32, 33 in its opposite ends, the land L4 needs throttle notches 35 in only its right hand end. This is because the valve spool has only one position at which pump fluid is required for motor operation. Movement of the valve spool to the right of its neutral position shown will close off the open center passage in the same way as described in connection with the valve of FIG. 1, and cause pump fluid to be diverted to service passage 15 via feeder port 20, throttle notches 32, spool groove G5 and passage 28 which is a branch of the service passage 15.

In one metering position of the spool, its notches 35 will provide limited communication between branches 21 and 23 of the open center passage, and its notches 32 will similarly provide limited communication between the feeder port 20 and service passage 15. In the other metering position of the spool, motor exhaust fluid flows from service passage 15 to the exhaust port via throttle notches 33 the discharge ends of which open to the bore.

From the foregoing description, together with the accompanying drawings, it will be readily apparent to those skilled in the art that in all of the embodiments described, the particular placement of the throttle notches with respect to the novel arrangement of valve passages results in assurance that fluid flowing through the notches will always debouch into the bore in which the valve spool operates, to effect the most significant reduction in axial momentum or reaction forces on the spool due to flow of fluid at high pressure past the ends of the lands on the spool on its way from one passage to another.

It will also be apparent that this invention produces a hydraulic control valve having a spool which can be actuated with a minimum of effort consistent with stability of the spool in all metering positions thereof.

Those skilled in the art will appreciate that the invention can be embodied in forms other than as herein disclosed for purposes of illustration.

The invention is defined by the following claims:

I claim:

1. A control valve having a valve spool with alternately spaced grooves and lands, and a bore in which the spool is slidable from one to the other of a pair of metering positions in the former of which it provides for restricted flow of supply fluid concurrently along first and second paths leading through spaced zones of the bore and through throttle notches in the ends of certain of said lands, one of said paths leading from upstream to downstream branches of a fluid supply passage and the second one of said paths leading to a service passage, said spool being operable in the other of said metering positions thereof to provide for restricted flow of return fluid to a tank passage along a third path leading through the bore from the service passage and extending through similar throttle notches in the end of one of said lands, characterized by:

A. an arrangement of passages, lands, and throttle notches such that in each metering position of the spool fluid travelling along each of said paths is constrained to flow through the throttle notches thereof before such fluid enters the bore;

B. and each of said throttle notches having a bottom wall which faces toward the periphery of the spool and diverges at a small acute angle away from the spool axis toward the adjacent spool groove, and a concave side wall which faces toward the adjacent groove and is normal to said bottom wall.

2. The control valve of claim 1, further characterized by:

A. said valve spool being operable in both of its said metering positions to provide restricted communication between upstream and downstream branches of the supply passage via the bore and throttle notches of said configuration in the spool at one end of each of a pair of said grooves;

B. said valve having a second service passage;

C. the valve spool being operable in said metering positions thereof to restrictedly direct supply fluid to a selected one of said service passages and to restrictedly communicate the non-selected service passage with a tank passage, all via the bore and throttle notches of said configuration in the spool lands;

D. and said passages, lands and throttle notches being so arranged as to constrain pressure fluid flowing through all of said throttle notches to pass therethrough before entering the bore.

3. The control valve of claim 2, wherein the side wall of each throttle notch is cylindrically surfaced and concentric to an axis which intersects that of the spool and recedes at a substantially small acute angle from said adjacent groove outwardly of the spool axis.

4. A control valve having a bore with a valve spool slidable axially therein and having spaced grooves and lands with throttle notches in their ends to limit flow of pressure fluid to a service passage and from upstream to downstream branches of a supply passage through the bore in a first metering position of the spool, and to limit flow of return fluid through the bore to a tank passage from said service passage in a second metering position of the spool, said control valve being characterized by:

A. passages, lands and throttle notches such that wherever fluid flows from one passage to another via the bore and throttle notches in one of said lands, such fluid is constrained to travel through the throttle notches before entering the bore;

B. and each of said throttle notches opening to one of said grooves and to the periphery of its land, and having 1. a bottom wall which recedes from the spool axis toward the adjacent groove, at an angle of from 5° to 25° to the spool axis, 2. and a concave side wall which is substantially normal to said bottom wall.

5. A control valve having a bore to which service, feeder and tank passages open, and a valve spool which is slidable axially in the bore from a neutral position to each of a pair of working positions to communicate the service passage with either the feeder passage or with a tank passage, characterized by the following:

A. grooves in the spool defining axially spaced lands thereon;

B. a first set of throttle notches in an end of one of said lands through which fluid can flow to the bore from the feeder passage in one of said working positions of the valve spool;

C. a second set of throttle notches in an end of one of said lands through which fluid can flow to the bore from the service passage in the other of said working positions of the valve spool;

D. each of said throttle notches opening to one of said grooves and to the periphery of its land and having 1. a bottom wall which recedes from the spool axis toward the adjacent groove, at an angle of from 5° to 25° to the spool axis, 2. and a concave side wall which is substantially normal to said bottom wall;

E. and passage defining means 1. operable in said one working position of the spool to provide for flow to the service passage of pressure fluid debouching into the bore from said first set of throttle notches, 2. and operable in the other of said working positions of the spool to provide for flow to said tank passage of return fluid debouching into the bore from the second set of throttle notches.

6. The control valve of claim 5 further characterized by:

A. a supply passage in the valve having upstream and downstream branches which open to the bore at axially spaced zones;

B. said grooves defining a land on the spool having an end portion which is carried into the bore between said zones to thereby restrict communication between said branches when the spool is moved to said one operating position thereof;

C. and throttle notches of said configuration in said end portion of the last named land, through which fluid must flow from the upstream to the downstream branches of the supply passage along a path leading serially through the notches and the bore.

7. The control valve of claim 5, further characterized by:

A. said service passage opening to the bore at a location between the junctions of the bore with the feeder and tank passages;

B. and said passage defining means comprising a passageway having one end in communication with the service passage and its other end communicated with the bore at a zone near the junction of the bore and feeder passage and at the side of the latter remote from the service passage.

8. The control valve of claim 7, further characterized by:

A. a supply passage in the valve having upstream and downstream branches which open to the bore at axially spaced zones;

B. said grooves defining a land on the spool having an end portion which is carried into the bore between said zones to thereby restrict communication between said branches when the spool is moved to said one operating position thereof;

C. and throttle notches of said configuration in said end portion of the last named land, through which fluid must flow from the upstream to the downstream branches of the supply passage along a path leading serially through the notches and the bore.

9. The control valve of claim 5, further characterized by:

A. said service passage opening to the bore at a first zone;
B. the feeder and tank passages opening to the bore at second and third zones, respectively, at opposite sides of said first zone;
C. and said passage defining means comprising a passageway having one end in communication with the bore at a location between said first and second zones, and having its other end in communication with the bore at a location between said first and third zones.

10. The control valve of claim 9, further characterized by:
A. a supply passage in the valve having upstream and downstream branches which open to the bore at axially spaced zones;
B. said grooves defining a land on the spool having an end portion which is carried into the bore between said zones to thereby restrict communication between said branches when the spool is moved to said one operating position thereof;
C. and throttle notches of said configuration in said end portion of the last named land, through which fluid must flow from the upstream to the downstream branches of the supply passage along a path leading serially through the notches and the bore.

11. The control valve of claim 5, further characterized by:
A. a second set of service, feeder and tank passages which open to the bore at axially spaced locations;
B. the second service passage being communicable with the second tank passage by the valve spool in said one working position thereof, and being communicable with the second feeder passage by the spool in said other working position thereof;
C. a third set of said throttle notches in an end of one of said lands, through which fluid can flow to the bore from the second service passage in said one working position of the spool;
D. a fourth set of said throttle notches in an end of one of said lands, through which fluid can flow to the bore from the second feeder passage in the other of said working positions of the spool;
E. and other passage defining means
  1. operable in said one working position of the spool to provide for flow to the second tank passage of fluid debouching from the third set of throttle notches,
  2. and operable in said other working position of the spool to provide for flow to the second service passage of pressure fluid debouching from the fourth set of throttle notches.

12. The control valve of claim 11, further charactaerized by:
A. a supply passage having a center upstream branch and flanking downstream branches; and
B. land members on the spool to govern communication between said supply passage branches, including a single land which is normally centered with respect to the upstream branch of the supply passage and has throttle notches of said configuration in its opposite ends to restrict flow into the bore from the upstream supply passage branch upon movement of the spool toward either of its working positions.

* * * * *

UNITED STATES PATENT OFFICE
CERTIFICATE OF CORRECTION

Patent No. 3,729,026              Dated April 24, 1973

Inventor(s) WILKE, RAUD A

It is certified that error appears in the above-identified patent and that said Letters Patent are hereby corrected as shown below:

Claim 1 (17 of application) last line: The phrase ", said side wall being curved about an axis which intersects that of the spool.--is omitted after "said bottom wall".

Claim 5 (claim 19 of application) Section D(2) the phrase ", said side wall being curved about an axis which intersects that of the spool" is omitted after "said bottom wall"

Claim 4 (claim 5 of application) Section B(2) the phrase ", said side wall being curved about an axis which intersects that of the spool." is omitted after "said bottom wall".

Signed and sealed this 20th day of November 1973.

(SEAL)
Attest:

EDWARD M. FLETCHER, JR.
Attesting Officer

RENE D. TEGTMEYER
Acting Commissioner of Patents